United States Patent Office 3,092,069
Patented June 4, 1963

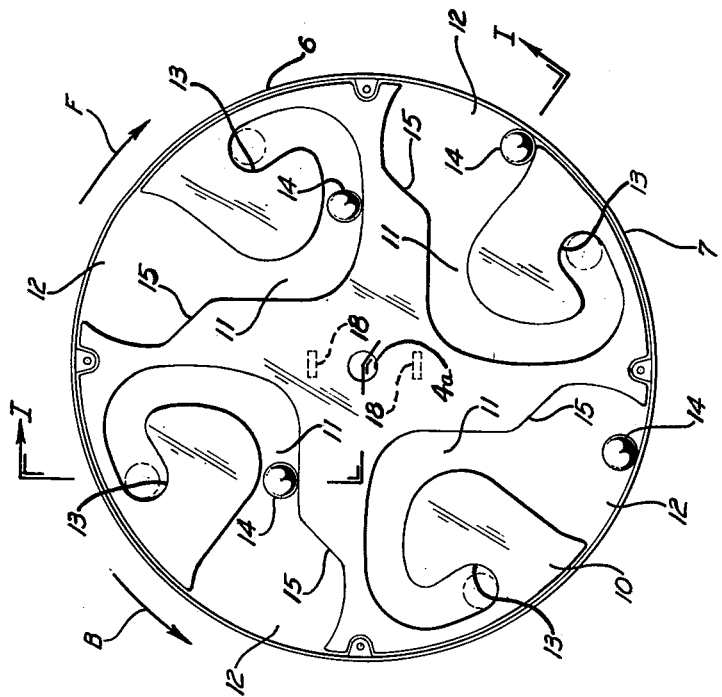
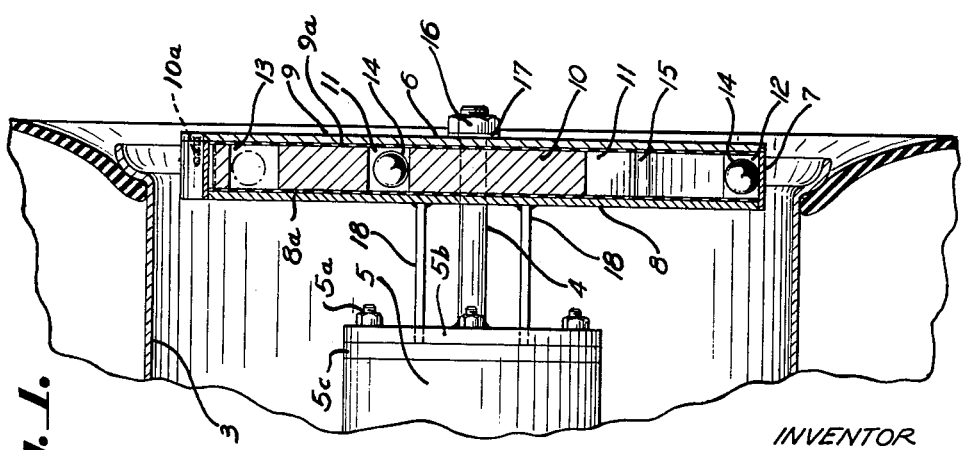

3,092,069
BACK-UP WARNING DEVICE FOR VEHICLES
James W. Baird, 405 Center St., Grove City, Pa.
Filed June 29, 1962, Ser. No. 206,237
6 Claims. (Cl. 116—60)

This invention relates to a back-up warning device for vehicles and particularly such a device which is relatively simple and inexpensive to construct and easy to install and which produces an audible sound of optimum loudness.

My back-up warning device comprises an attachment adapted to be applied to a vehicle wheel and including a rim of material emitting an easily audible sound when struck a blow together with means within the rim adapted to be propelled against the rim by gravity and centrifugal force when the vehicle to which the device is attached moves backward to create an easily audible sound.

I provide means within the rim of my back-up warning device forming in the plane of the rim a channel terminating at the rim at one end of the channel and terminating in a pocket near but spaced from the rim at the opposite end of the channel. I provide a ball which is disposed in the channel, the ball being of material creating an easily audible sound when striking the rim. Preferably both the ball and the rim are made of steel or other resonant material. When the warning device turns upon backward movement of the vehicle the first mentioned end of the channel precedes the second mentioned end of the channel and the ball is by gravity and centrifugal force propelled against the rim when the channel is disposed downwardly from the axis of the rim, creating an easily audible sound, while when the device turns upon forward movement of the vehicle the second mentioned end of the channel precedes the first mentioned end of the channel and the ball rolls into the pocket when the channel is disposed downwardly from the axis of the rim. The ball is disposed in the intermediate portion of the channel between the ends thereof when the channel is disposed upwardly from the axis of the rim, except that when the vehicle is moving forward at high speed the ball remains in the pocket due to centrifugal force.

I have found it satisfactory to provide four channels as described above, preferably disposed at equal angular distances about the rim. More than four such channels are not desirable as when the number of channels is increased beyond four the channels and the balls have to be smaller than when there are only four channels, resulting in a softer sound of higher frequency which is not as easily audible as the sound produced by four larger balls. My device may employ a number of channels and balls less than four, as, for example, three or even two or in certain instances one. It is preferable to employ more than one so that the device may be balanced.

Preferably the second mentioned end of the channel terminates in a pocket whose extremity is disposed toward the first mentioned end of the channel. Thus when the device turns upon a forward movement of the vehicle the second mentioned end of the channel precedes the first mentioned end thereof and the ball rolls into the pocket when the channel is disposed downwardly from the axis of the rim.

Preferably the channel at the first mentioned end thereof is relatively wide as compared with the diameter of the ball to permit the ball to be propelled freely against the rim so that a sound of optimum loudness is produced when the ball strikes the rim. I find that best results are obtained when the channel at the first mentioned end thereof is abruptly widened so that when the device turns upon backward movement of the vehicle the ball is propelled toward the rim out of contact with the walls of the channel which are transverse of the plane of the rim. Preferably the channel at the second mentioned end thereof is only slightly wider than the diameter of the ball whereby that portion of the channel substantially guides the ball for rolling movement.

Other details, objects and advantages of the invention will become apparent as the following description of a present preferred embodiment thereof proceeds.

In the accompanying drawings I have shown a present preferred embodiment of the invention in which FIGURE 1 is an axial cross section through a portion of a wheel having my device applied thereto; and FIGURE 2 is a face view of my device with the outer closure member removed.

Referring now more particularly to the drawings, I have shown more or less diagrammatically a portion of a vehicle wheel 3 such as a motor truck wheel and a portion of a hub 5 coaxial with the wheel 3. Bolted to the hub 5 by bolts 5a is a plate 5b having an axial extension 4 of greatly reduced diameter as compared with the hub 5. Applied centrally to the wheel is my back-up warning device or attachment which is designated generally by reference numeral 6. The extension 4 passes through a central bore 4a through the device. The attachment or device 6 has a peripheral rim 7 and parallel planar inner and outer faces formed by closure members 8 and 9 with liners of sound-proofing material 8a and 9a respectively applied to the insides of the closure members 8 and 9.

Disposed within the rim 7 and between the inner and outer closure members of the device 6 is an insert 10, which may be made of any suitable material such as wood or plastic, shaped to form within the rim four channels 11 each terminating at the rim at 12 at one end of the channel and terminating in a pocket 13 near but spaced from the rim 7 at the opposite end of the channel. A ball 14 is disposed in each of the four channels 11. I prefer to make the rim 7 and the balls 14 of steel or other resonant material so that each ball when propelled against the rim will create an easily audible sound, perhaps resembling the sound of a bell.

The extremity or bottom of each pocket 13 is, as shown, disposed toward the end 12 of the channel 11 which includes that pocket. Also as shown each channel is at the end 12 thereof relatively wide as compared with the diameter of the ball 14 to permit the ball to be propelled freely against the rim so that a sound of optimum loudness is produced when the ball strikes the rim. Each channel near the first mentioned end 12 thereof is shown as being abruptly widened at 15 so that when the rim turns upon backward movement of the vehicle the ball therein is propelled toward the rim out of contact with the walls of the channel which are transverse to the plane of the rim. At the second mentioned end thereof each channel is only slightly wider than the diameter of the ball 14 whereby that portion of the channel substantially guides the ball for rolling movement.

When the vehicle moves forward the device 6 turns in the clockwise direction as indicated by the arrow F in FIGURE 2. Upon turning of the device in that direction each of the balls 14 in turn rolls smoothly into its pocket 13 as the channel containing that ball moves downwardly below the axis of the rim. As such movement continues each ball remains in its pocket until its channel is disposed well above the axis of the device on its upward movement at which time the ball may roll to some extent in the portion of the channel near the pocket 13 if the vehicle is moving slowly. When the vehicle is moving forward at high speed the balls remain in the pockets 13 due to centrifugal force; they are thus shown in dotted lines in FIGURE 2. Upon forward movement of the vehicle at any speed each ball remains in or near its pocket 13 and does not engage the rim 7 so no substantial audible sound is created.

When the vehicle moves in the backward direction the device turns in the counterclockwise direction as indicated by the arrow B in FIGURE 2. As each channel 11 moves downwardly past the level of the extension 4 the ball therein moves toward the wide open and 12 of the channel and past the location 15 where the channel is abruptly widened resulting in the ball being propelled toward the rim 7 by gravity and centrifugal force and out of contact with the walls of the channel which are transverse to the plane of the rim. The result is that the ball strikes the rim with optimum impact. As the device continues to turn in the direction of the arrow B the ball rolls away from the rim into the channel 11 and when the channel 11 is disposed upwardly the ball is in the intermediate portion of the channel between the ends thereof. The balls 14 are shown in solid lines in FIGURE 2 in the positions they occupy when the vehicle is moving backward.

Thus I provide a back-up warning device which gives an effective warning and is adapted, for example, to be used on trucks in construction projects and at other places where there is considerable noise, necessitating that the back-up warning be quite loud in order to be heard over the surrounding noise.

The rim 7, the closure members 8 and 9 with the liners 8a and 9a and the insert 10 may be fastened together by any suitable means such as screws 10a.

The device is adapted to be clamped tightly against the hub 5 by a nut 16 and washer 17 applied to the extension 4. The device is provided with projections 18 extending through openings in the plate 5b eccentrically of the axis thereof to positively insure against turning of the device relatively to the wheel, the ends of the projections bearing against the end member 5c of the hub 5 so that the device is positioned and maintained in place by the projections 18, the extension 10 and the nut and washer 16 and 17.

While I have shown and described a present preferred embodiment of the invention it is to be distinctly understood that the invention is not limited thereto but may be otherwise variously embodied within the scope of the following claims.

I claim:

1. A back-up warning device adapted for attachment to a vehicle wheel to turn with the wheel comprising a rim of material emitting an easily audible sound when struck a blow and means within the rim forming in the plane of the rim a channel terminating at the rim at one end of the channel and terminating in a pocket near but spaced from the rim at the opposite end of the channel and a ball in the channel, the ball being of material creating an easily audible sound when striking the rim, so that when the device turns upon backward movement of the vehicle the first mentioned end of the channel precedes the second mentioned end of the channel and the ball is by gravity and centrifugal force propelled against the rim when the channel is disposed downwardly from the axis of the rim, creating an easily audible sound, while when the device turns upon forward movement of the vehicle the second mentioned end of the channel precedes the first mentioned end of the channel and the ball rolls into the pocket when the channel is disposed downwardly from the axis of the rim, the ball being disposed in the intermediate portion of the channel between the ends thereof when the channel is disposed upwardly from the axis of the rim.

2. A back-up warning device adapted for attachment to a vehicle wheel to turn with the wheel comprising a rim of material emitting an easily audible sound when struck a blow and means within the rim forming in the plane of the rim four channels disposed at equal angular distances about the rim, each channel terminating at the rim at one end of the channel and terminating in a pocket near but spaced from the rim at the opposite end of the channel, and a ball in each channel, the balls being of material creating an easily audible sound when striking the rim, so that when the device turns upon backward movement of the vehicle the first mentioned end of each channel precedes the second mentioned end thereof and the ball therein is by gravity and centrifugal force propelled against the rim when the channel is disposed downwardly from the axis of the rim, creating an easily audible sound, while when the device turns upon forward movement of the vehicle the second mentioned end of each channel precedes the first mentioned end thereof and the ball therein rolls into the pocket thereof when the channel is disposed downwardly from the axis of the rim, the ball in each channel being disposed in the intermediate portion thereof between the ends thereof when the channel is disposed upwardly from the axis of the rim.

3. A back-up warning device adapted for attachment to a vehicle wheel to turn with the wheel comprising a rim of material emitting an easily audible sound when struck a blow and means within the rim forming in the plane of the rim a channel terminating at the rim at one end of the channel and terminating in a pocket whose extremity is disposed toward the first mentioned end of the channel near but spaced from the rim at the opposite end of the channel and a ball in the channel, the ball being of material creating an easily audible sound when striking the rim, so that when the device turns upon backward movement of the vehicle the first mentioned end of the channel precedes the second mentioned end of the channel and the ball is by gravity and centrifugal force propelled against the rim when the channel is disposed downwardly from the axis of the rim, creating an easily audible sound, while when the device turns upon forward movement of the vehicle the second mentioned end of the channel precedes the first mentioned end of the channel and the ball rolls into the pocket when the channel is disposed downwardly from the axis of the rim, the ball being disposed in the intermediate portion of the channel between the ends thereof when the channel is disposed upwardly from the axis of the rim.

4. A back-up warning device as claimed in claim 1 in which the channel at the first mentioned end thereof is relatively wide as compared with the diameter of the ball to permit the ball to be propelled freely against the rim so that a sound of optimum loudness is produced when the ball strikes the rim.

5. A back-up warning device as claimed in claim 1 in which the channel at the first mentioned end thereof is abruptly widened so that when the device turns upon backward movement of the vehicle the ball is propelled toward the rim out of contact with the walls of the channel which are transverse to the plane of the rim.

6. A back-up warning device as claimed in claim 1 in which the channel at the first mentioned end thereof is relatively wide as compared with the diameter of the ball to permit the ball to be propelled freely against the rim so that a sound of optimum loudness is produced when the ball strikes the rim and the channel at the second mentioned end thereof is only slightly wider than the diameter of the ball whereby that portion of the channel substantially guides the ball for rolling movement.

References Cited in the file of this patent

UNITED STATES PATENTS

| | | |
|---|---|---|
| 2,915,036 | Bookwalter | Dec. 1, 1959 |
| 2,940,416 | Gierke et al. | June 14, 1960 |
| 2,997,977 | Flynn | Aug. 29, 1961 |

FOREIGN PATENTS

| | | |
|---|---|---|
| 868,027 | Great Britain | May 17, 1961 |